US012764023B2

(12) United States Patent
Li et al.

(10) Patent No.: US 12,764,023 B2
(45) Date of Patent: Oct. 13, 2026

(54) METHOD, SYSTEM, AND STORAGE MEDIUM FOR MULTI-GRANULARITY VIRTUAL NETWORK TOPOLOGY CONFIGURATION IN SDM OPTICAL NETWORKS UTILIZING MAML AND TRANSFER LEARNING

(71) Applicant: SUN YAT-SEN UNIVERSITY, Guangdong (CN)

(72) Inventors: Zhaohui Li, Guangdong (CN); Hanyu Gao, Guangdong (CN); Xiaoliang Chen, Guangdong (CN); Ruifeng Zhong, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 114 days.

(21) Appl. No.: 18/820,157

(22) Filed: Aug. 29, 2024

(65) Prior Publication Data

US 2025/0310200 A1 Oct. 2, 2025

(30) Foreign Application Priority Data

Mar. 27, 2024 (CN) ......................... 202410360462.8

(51) Int. Cl.

*H04L 41/0895* (2022.01)
*H04L 41/122* (2022.01)
*H04L 41/14* (2022.01)
*H04L 41/16* (2022.01)
*H04L 41/40* (2022.01)

(52) U.S. Cl.

CPC ........ *H04L 41/0895* (2022.05); *H04L 41/122* (2022.05); *H04L 41/145* (2013.01); *H04L 41/16* (2013.01); *H04L 41/40* (2022.05)

(58) Field of Classification Search

None

See application file for complete search history.

(56) References Cited

U.S. PATENT DOCUMENTS 10,652,046 B1 * 5/2020 Skobodzinski ......... H04L 12/44
12,217,137 B1 * 2/2025 Fakoor .................. G06N 20/00

(Continued)

OTHER PUBLICATIONS

Griva et al.; "Model-Agnostic Meta-Learning Techniques: A State-of-The-Art Short Review"; 2023 12th International Conference on Modern Circuits and Systems Technologies (MOCAST); 4 pg; Jun. 30, 2023. (Year: 2023).*

(Continued)

*Primary Examiner* — Jason D Cardone
(74) *Attorney, Agent, or Firm* — JCIPRNET

(57) ABSTRACT

The present invention provides a method and system for providing virtual network topology configuration services based on MAML and transfer learning, and a storage medium. The method includes: building a network architecture using a software-defined network; receiving, by the network architecture, configuration information to configure a virtual network topology; and calling, by the network architecture, an intelligent machine learning service providing module to execute an MAML algorithm and a transfer learning algorithm to provider a user with machine learning services, the machine learning services including quality of transmission estimation, fault management, and resource allocation.

9 Claims, 6 Drawing Sheets

(56) References Cited

U.S. PATENT DOCUMENTS

| | | | | |
|---|---|---|---|---|
| 2016/0173338 | A1* | 6/2016 | Wolting | H04L 41/122<br>709/223 |
| 2018/0337862 | A1* | 11/2018 | Sharma | H04L 43/087 |
| 2022/0191110 | A1* | 6/2022 | Wu | G06F 16/972 |
| 2022/0232579 | A1* | 7/2022 | Lee | H04W 28/0268 |
| 2023/0136756 | A1* | 5/2023 | Malboubi | G06N 20/00<br>709/224 |
| 2024/0333595 | A1* | 10/2024 | Pandey | H04L 41/122 |
| 2025/0124293 | A1* | 4/2025 | Carlson | G06N 20/00 |

OTHER PUBLICATIONS

Sartzetakis et al.; "Accurate quality of transmission estimation with machine learning"; Journal of Optical Communications and Networking (vol. 11, No. 3); pp. 140-150; Mar. 2019. (Year: 2019).*

* cited by examiner

METHOD, SYSTEM, AND STORAGE MEDIUM FOR MULTI-GRANULARITY VIRTUAL NETWORK TOPOLOGY CONFIGURATION IN SDM OPTICAL NETWORKS UTILIZING MAML AND TRANSFER LEARNING

CROSS-REFERENCE TO RELATED APPLICATION

This application claims the priority benefit of China application no. 202410360462.8, filed on Mar. 27, 2024. The entirety of the above-mentioned patent application is hereby incorporated by reference herein and made a part of this specification.

BACKGROUND

Technical Field

The present invention relates to the technical field of optical communications, in particular to a method and system for providing virtual network topology configuration services based on MAML and transfer learning, and a storage medium.

Description of Related Art

As fiber capacity approaches the Shannon limit, space division multiplexing (SDM) has emerged as an attractive solution to meet growing traffic demands. SDM networks achieve significant capacity gains by transmitting and switching signals in parallel across multiple spatial dimensions (optical fiber cores or spatial modes of light). However, in a current network ecosystem, there is a notable challenge: numerous network operators build different networks with significant differences in communication protocol and interface standard, and this decentralized network layout leads to complexities in network resource management and scheduling. Although reconfiguration of a network architecture may be a solution, such an approach is often accompanied by high costs. As an innovative response to this challenge, network virtualization technology has emerged. This technology enables infrastructure providers to support multiple virtual networks on their backbone networks. This support is realized through the configuration of virtual network topologies (VNTs) or network slices, which provide diverse quality of service guarantees on physical infrastructure. This approach dramatically increases the flexibility of service provision and enables the network to better meet the demands of a wide range of applications. It is foreseen that the combination of network virtualization and SDM will help to leverage the multidimensional resources of SDM networks.

In the prior art, the underlying network operator only provides an abstract view of the virtual network topology to tenants, which limits the capacity to manage network resources and hinders effective utilization of the resources. The introduction of machine learning (ML) techniques provides a solution to these challenges. By learning complex rules from data, machine learning can be effectively applied to areas such as quality of transmission (QoT) estimation, resource allocation, and fault management in optical networks, even in the absence of explicit physical models. While machine learning has demonstrated its potential in the area of automated and cognitive optical networks, it typically requires specialized personnel to configure and tune models. This approach is error prone and results in low quality of service and low efficiency of network virtualization.

SUMMARY

A primary object of the present invention is to overcome the problems in the prior art and provide a method for providing virtual network topology configuration services based on MAML and transfer learning. By means of the present invention, the quality of service and the efficiency of network virtualization can be improved.

As another object of the present invention, based on the method of the preceding object, a system adapted thereto is provided.

As a further object of the present invention, a non-volatile storage medium suitable for storing a computer program realized according to the described method is provided.

In order to realize the primary object described above, the present invention provides a method for providing virtual network topology configuration services based on MAML and transfer learning. The method includes:

- step S1: building a network architecture using a software-defined network;
- step S2: receiving, by the network architecture, configuration information to configure a virtual network topology; and
- step S3: calling, by the network architecture, an intelligent machine learning service providing module to execute an MAML algorithm and a transfer learning algorithm to provide a user with machine learning services, the machine learning services including quality of transmission estimation, fault management, and resource allocation.

Further, in step S1, the network architecture includes a network orchestrator, the virtual network topology and a physical base, the physical base including a space division multiplexing controller; and the building a network architecture includes:

- receiving, by the network orchestrator, first information and second information sent by the user, the first information being a virtual network and the machine learning services required by the user, and the second information being a quality of transmission requirement of the user under a specific baud rate and modulation format; and
- receiving, by the space division multiplexing controller, a request sent by the network orchestrator to acquire current space division multiplexing network topology information, and sending, by the space division multiplexing controller, a space division multiplexing network topology to the network orchestrator.

Further, the physical base further includes a multi-granularity node structure used for multi-granularity switching performed by space division multiplexing network nodes in core and spectrum dimensions.

Further, the multi-granularity node structure includes a multi-core optical fiber, an optical switch and a wavelength selection switch, a fan-in and fan-out device of the multi-core optical fiber and the wavelength selection switch are connected to the optical switch to realize the multi-granularity switching performed by the space division multiplexing network nodes in the core and spectrum dimensions.

Further, the space division multiplexing network nodes have an optical monitoring function.

Further, the optical monitoring function includes measurement of power and noise levels.

Further, the configuration information in step S2 includes the first information and the second information.

Further, step S2 includes:

receiving, by the network orchestrator, the configuration information;

acquiring, by the network orchestrator, a sublevel space division multiplexing network topology, and calling a virtual network topology mapping algorithm according to the configuration information to calculate nodes, link mapping and space/spectrum channel allocation of a required space division multiplexing network; and sending, by the network orchestrator, third information to the space division multiplexing controller, mapping, by the space division multiplexing controller, corresponding node constraints to corresponding base nodes, mapping, by the space division multiplexing controller, virtual link resources to a lightpath of the physical base, and transmitting, by the network orchestrator, fourth information to the virtual network topology controller such that the virtual network topology controller updates the virtual network topology, so as to complete configuration of the virtual network topology, the third information being to isolate and allocate resources of the physical base, the fourth information being a new virtual network topology.

In order to realize another object described above, the present invention provides a system for providing virtual network topology configuration services based on MAML and transfer learning. The system includes:

a building module configured to build a network architecture using a software-defined network;

a configuration module configured to receive, by the network architecture, configuration information to configure a virtual network topology; and a service providing module configured to call, by the network architecture, an intelligent machine learning service providing module to execute an MAML algorithm and a transfer learning algorithm to provide a user with machine learning services, the machine learning services including quality of transmission estimation, fault management, and resource allocation.

In order to realize another object of the present invention, the present invention provides a computer-readable storage medium, and a computer program of a method for providing virtual network topology configuration services based on MAML and transfer learning is stored on the computer-readable storage medium. The computer program of the method for providing virtual network topology configuration services based on MAML and transfer learning, when processed, implements the steps of the method for providing virtual network topology configuration services based on MAML and transfer learning.

Compared with the prior art, the present invention has the following beneficial effects.

According to the present invention, the network architecture and the multi-granularity node structure are built by using the software-defined network, the network architecture receives the configuration information to configure the virtual network topology, and finally the network architecture calls the intelligent machine learning service providing module to execute the MAML algorithm and the transfer learning algorithm to provide the user with the machine learning services, so that automatic and intelligent provision of the machine learning services is achieved, and the problems of poor quality of service and low efficiency caused by manual deployment of a machine model for a network to provide machine learning services are avoided. Therefore, the model deployment time is shortened, and the deployment efficiency and the quality of service are improved.

DESCRIPTION OF THE EMBODIMENTS

The specific implementations of the present invention are further described in detail below in conjunction with the accompanying drawings and embodiments. The embodiments below are provided to illustrate the present invention, and are not intended to limit the scope of the present invention.

Embodiment 1

Figure 1:
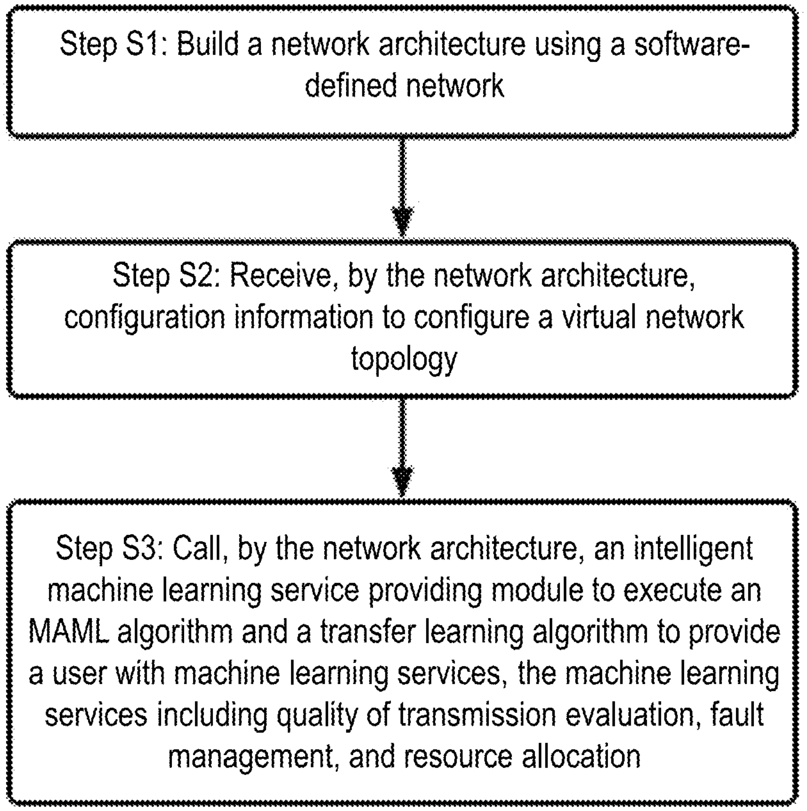
FIG. 1 is a flowchart of a method for providing virtual network topology configuration services based on MAML and transfer learning according to an embodiment of the present invention.

As shown in FIG. 1, a method for providing virtual network topology configuration services based on MAML and transfer learning according to a preferred embodiment of the present invention includes the following steps.

In step S1, a network architecture is built using a software-defined network.

In this embodiment, the network architecture in step S1 includes a network orchestrator, a virtual network topology and a physical base, and the physical base includes a space division multiplexing controller. The operation of building the network architecture includes:

the network orchestrator receives first information and second information sent by a user, the first information being a virtual network and machine learning services required by the user, and the second information being a quality of transmission requirement of the user under a specific baud rate and modulation format; and the space division multiplexing controller receives a request sent by the network orchestrator to acquire current space division multiplexing network topology information, and the space division multiplexing controller sends a space division multiplexing network topology to the network orchestrator.

The physical base further includes a multi-granularity node structure used for multi-granularity switching performed by space division multiplexing network nodes in core and spectrum dimensions. The multi-granularity node structure includes a multi-core optical fiber, an optical switch and a wavelength selection switch. A fan-in and fan-out device of the multi-core optical fiber and the wavelength selection switch are connected to the optical switch to realize the multi-granularity switching performed by the space division multiplexing network nodes in the core and spectrum dimensions. The space division multiplexing network nodes have an optical monitoring function. The optical monitoring function includes measurement of power and noise levels.

In step S2, the network architecture receives configuration information to configure the virtual network topology.

In this embodiment, the configuration information in step S2 includes the first information and the second information.

Step S2 includes:

the network orchestrator receives the configuration information;

the network orchestrator acquires a sublevel space division multiplexing network topology, and calls a virtual network topology mapping algorithm according to the configuration information to calculate nodes, link mapping and space/spectrum channel allocation of a required space division multiplexing network; and the network orchestrator sends third information to the space division multiplexing controller, the third information being to isolate and allocate resources of the physical base, corresponding node constraints are mapped to corresponding base nodes by the space division multiplexing controller, virtual link resources are mapped to a lightpath of the physical base by the space division multiplexing controller, and fourth information is transmitted to the virtual network topology controller by the network orchestrator such that the virtual network topology controller update the virtual network topology, so as to complete configuration of the virtual network topology, the fourth information being a new virtual network topology.

In step S3, the network architecture calls an intelligent machine learning service providing module to execute an MAML algorithm and a transfer learning algorithm to provide the user with the machine learning services, the machine learning services including quality of transmission estimation, fault management, and resource allocation.

This embodiment illustrates the present invention with an example of the provision of a QoT estimator. The MAML algorithm and the transfer learning method are used in computing the QoT estimator. First, the MAML algorithm is a model-independent meta-learning method, which is successfully applied to a wide range of learning tasks such as classification, regression, and information reinforcement learning. The core idea of the MAML algorithm is to enable the algorithm to quickly adapt to a new task by learning from many different tasks. The uniqueness of the MAML algorithm is that the algorithm is not specific to a particular machine learning model, but is compatible with a wide range of model types. The operational process thereof includes two phases: in the meta-training phase, the algorithm is trained on multiple tasks with the aim of finding an optimized initial parameter for the model; and in the adaptive phase, the algorithm quickly adapts to new tasks using the found initial parameter. This algorithm is particularly suitable for new tasks with only a small amount of data, where performance may be significantly improved with a small number of optimization steps. Second, transfer learning is a technique that enables machine learning models to "transfer" knowledge from one task to another. Transfer learning is based on the assumption that even different tasks may contain common knowledge or patterns. In practice, transfer learning usually involves applying knowledge learned in one task (the source task) to a different but related task (the target task). This approach may utilize rich information learned in the source task to improve the performance of the model on the target task. The specific algorithm flow is as follows:

a collection $D=\{D_1, D_2, \ldots, D_N\}$ of cognitive function datasets of different lightpaths, a target lightpath dataset $D_t$, an initial neural network configuration $N_i$, and a group of feasible neural network configurations $N=\{N_1, N_2, \ldots, N_K\}$ are input; and the loss function is defined as follows:

$$\mathcal{L}_{D_i}(f_\phi) = \sum_{x^{(j)},y^{(j)}\sim D_i} \left\| f_\phi\left(x^{(j)}\right) - y^{(j)} \right\|_2^2$$

where $x^{(j)}$ and $y^{(j)}$ denote an input/output pair sampled from the lightpath dataset $D_i$.

This embodiment first trains an initial model $f_\varepsilon$ using a gradient descent method of MAML. The gradient update of the method is designed with a gradient by gradient strategy, including two rounds of gradient descent updates.

During each training process, the model gradient of each batch of data is first calculated as follows:

$$\nabla_\varepsilon \mathcal{L}_{D_i}(f_\varepsilon)$$

in each lightpath dataset, a batch of input/output pair data is sampled, and the parameters of a task are updated to complete the first round of gradient update:

$$\varepsilon_i = \varepsilon - \alpha \nabla_\varepsilon \mathcal{L}_{D_i}(f_\varepsilon)$$

where $\alpha$ denotes the learning rate of the first round of gradient update.

Subsequently, the second round of gradient update is performed based on the parameters obtained from the first round and the sampled input/output pair data. The new second round of gradient update is formed by a gradient-by-gradient strategy, which is directly applied to the original model:

$$\varepsilon \leftarrow \varepsilon - \beta \nabla_\varepsilon \sum_{D_i} \mathcal{L}_{D_i}\left(f_{\varepsilon_i'}\right)$$

where $\beta$ denotes the meta-learning rate of the second round of gradient update.

Thus, the purpose of the first round of gradient update is to prepare for the second round of gradient update, and the second round is the actual processing of the model parameters.

Next, the algorithm iterates through a number of feasible model configurations, i.e., neural networks with different numbers of layers, and in each configuration, the first min $\{Ng, N_K\}$ layers of $f_\varepsilon$ are transferred to a new model $f_k$ by transfer learning;

next, $f_k$ uses a small amount of $D_t$ for adaptive training; subsequently, the algorithm returns to the model $$f_t^*$$

with the highest accuracy configured by $N_k$; and finally, $$f_t^*$$

is provided to a tenant via the orchestrator.

Embodiment 2

Figure 3:
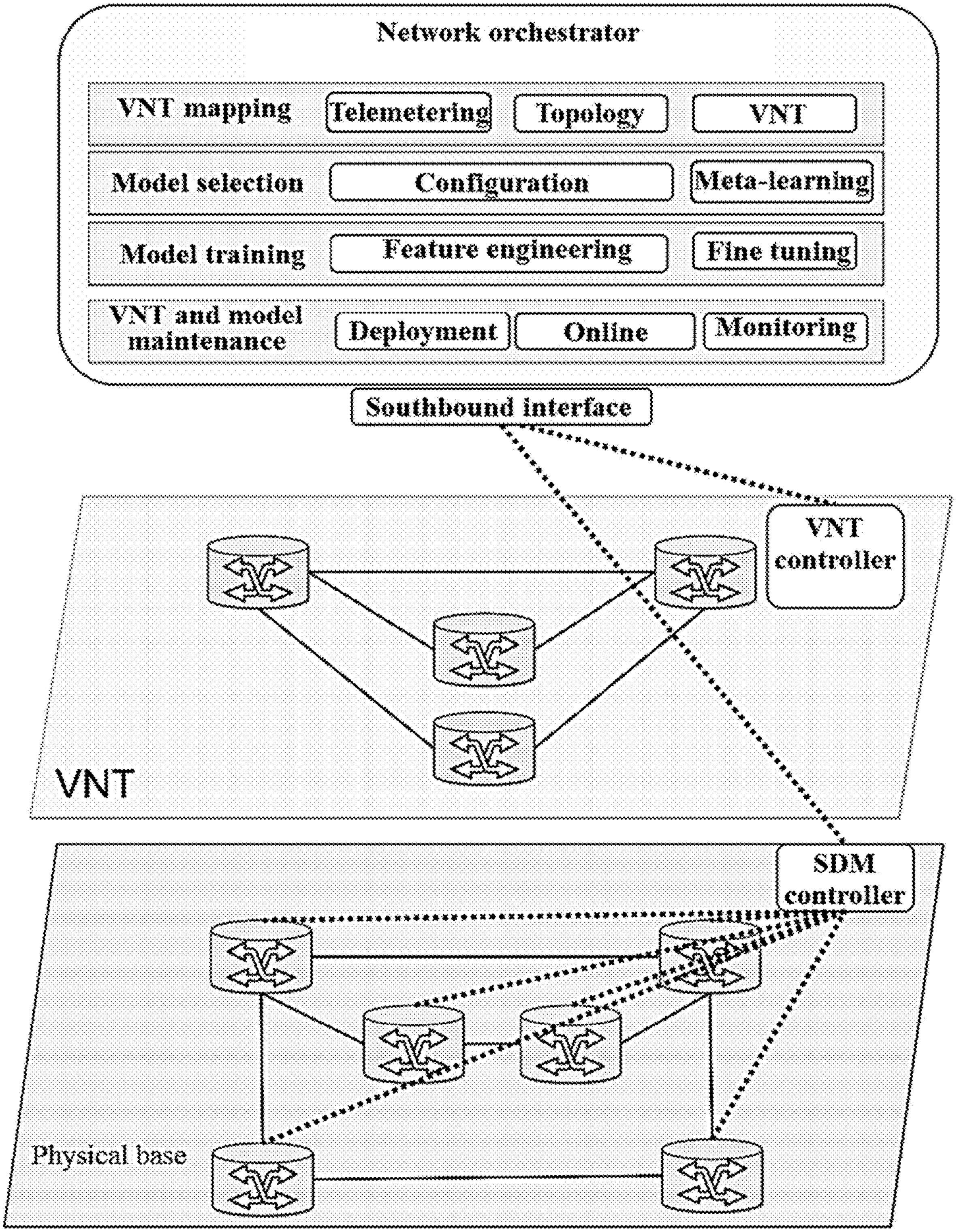
FIG. 3 is a structural diagram of a space division multiplexing network of a software-defined network of a method for providing virtual network topology configuration services based on MAML and transfer learning according to an embodiment of the present invention.
Figure 4:
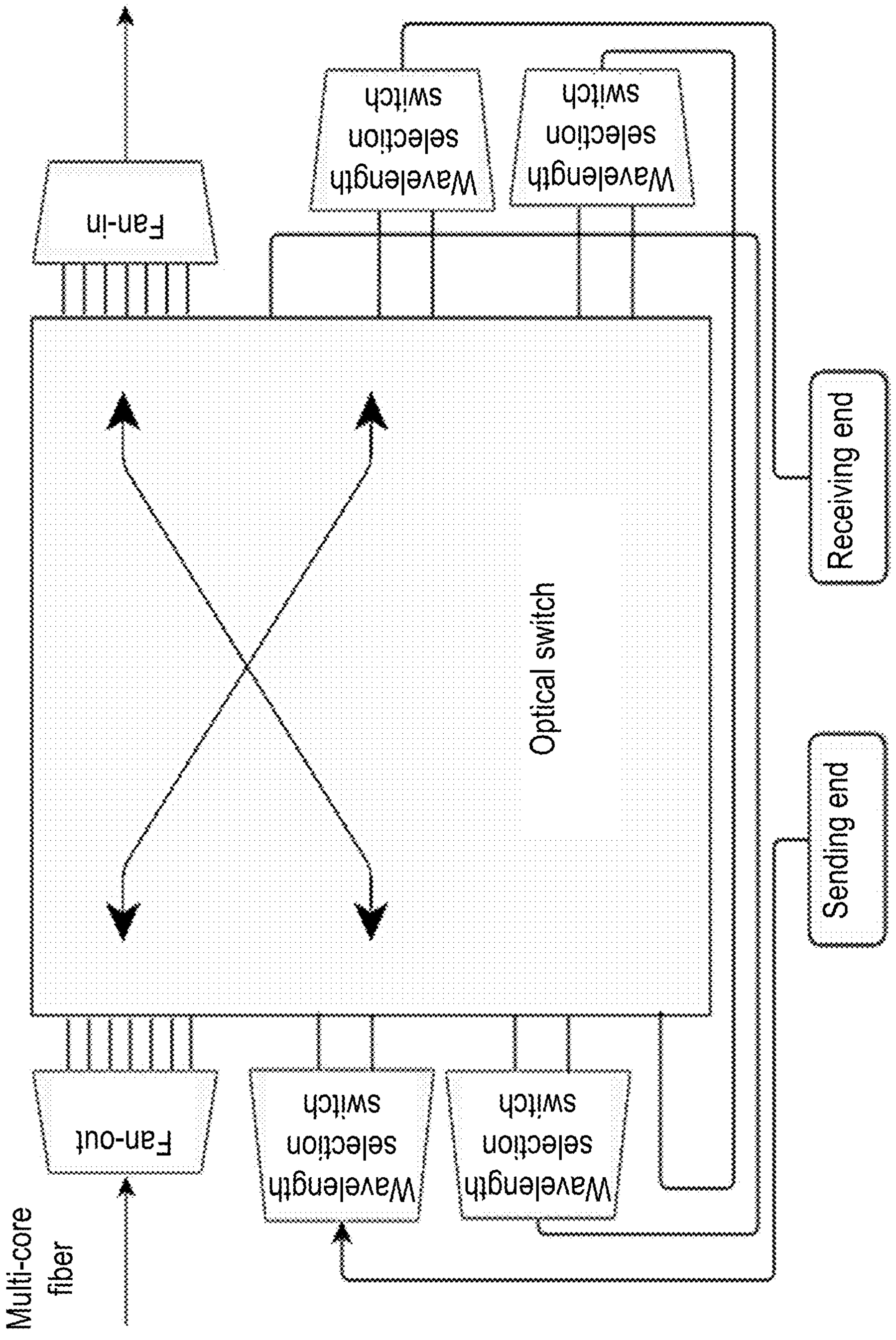
FIG. 4 is a structural diagram of a multi-granularity space division multiplexing network node of a method for providing virtual network topology configuration services based on MAML and transfer learning according to an embodiment of the present invention.
Figure 5:
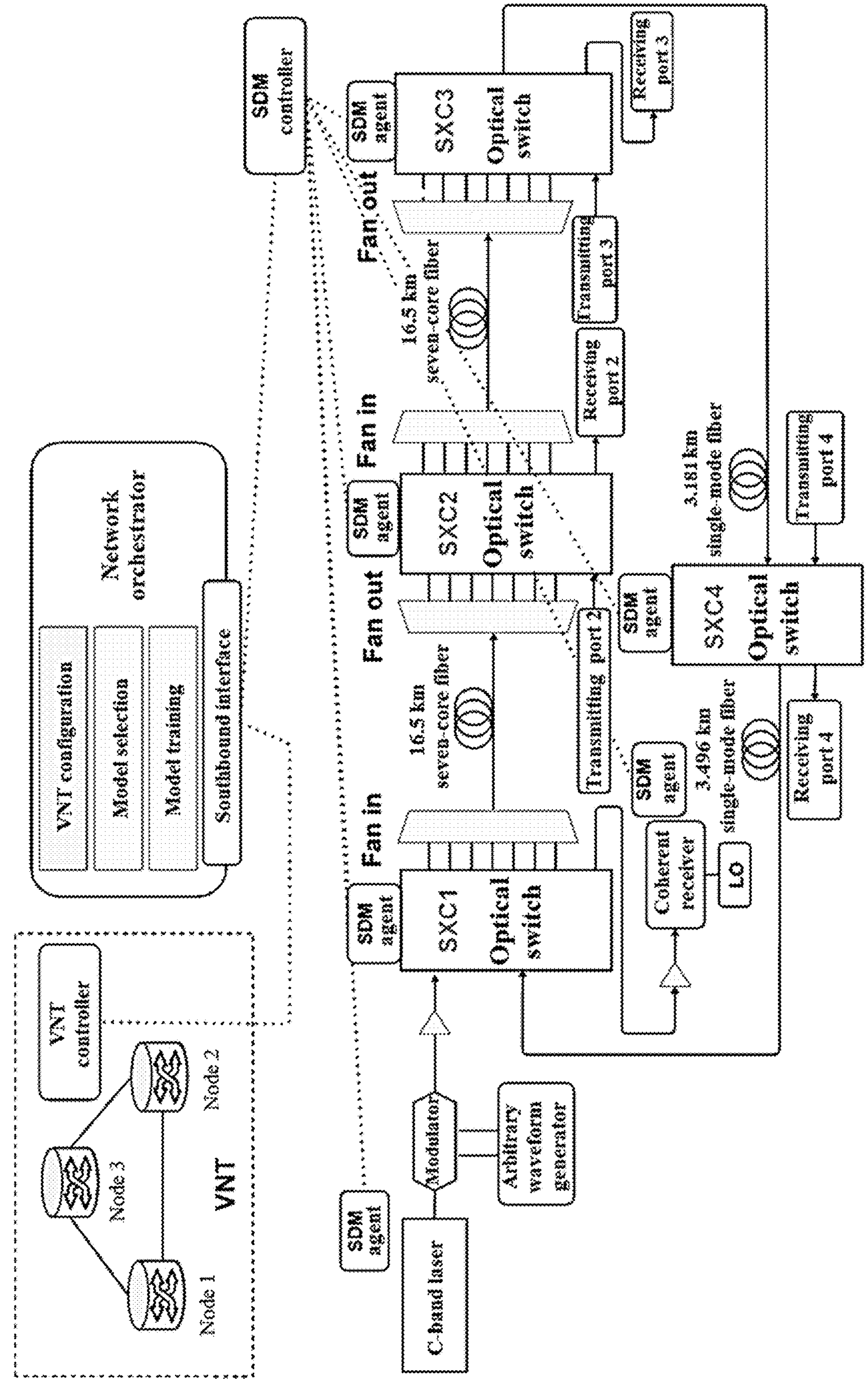
FIG. 5 is a design diagram of a method for providing virtual network topology configuration services based on MAML and transfer learning, based on a seven-core fiber and a single-mode fiber, according to an embodiment of the present invention.
Figure 6:
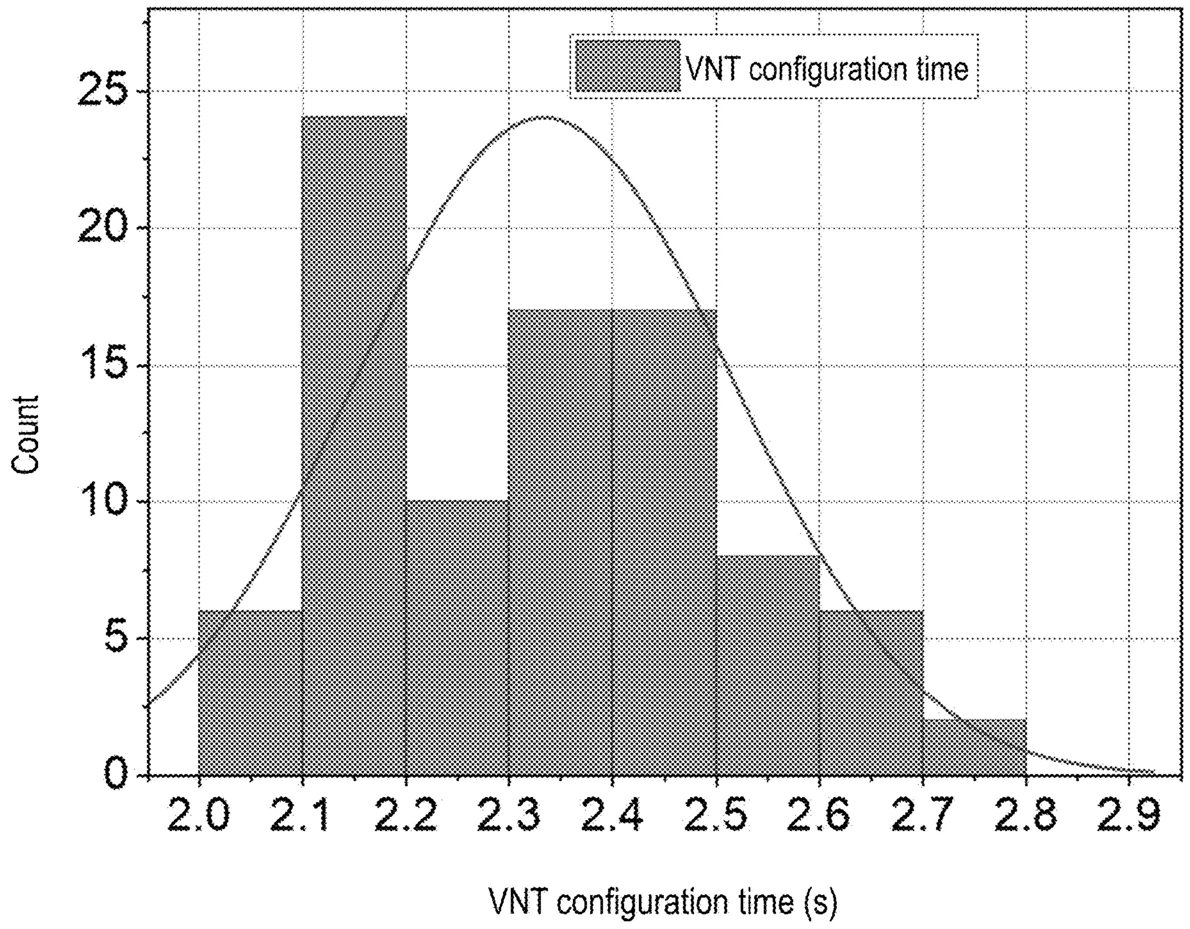
FIG. 6 is an example histogram of the VNT configuration time frequency distribution of a method for providing virtual network topology configuration services based on MAML and transfer learning according to an embodiment of the present invention.
Figure 7:
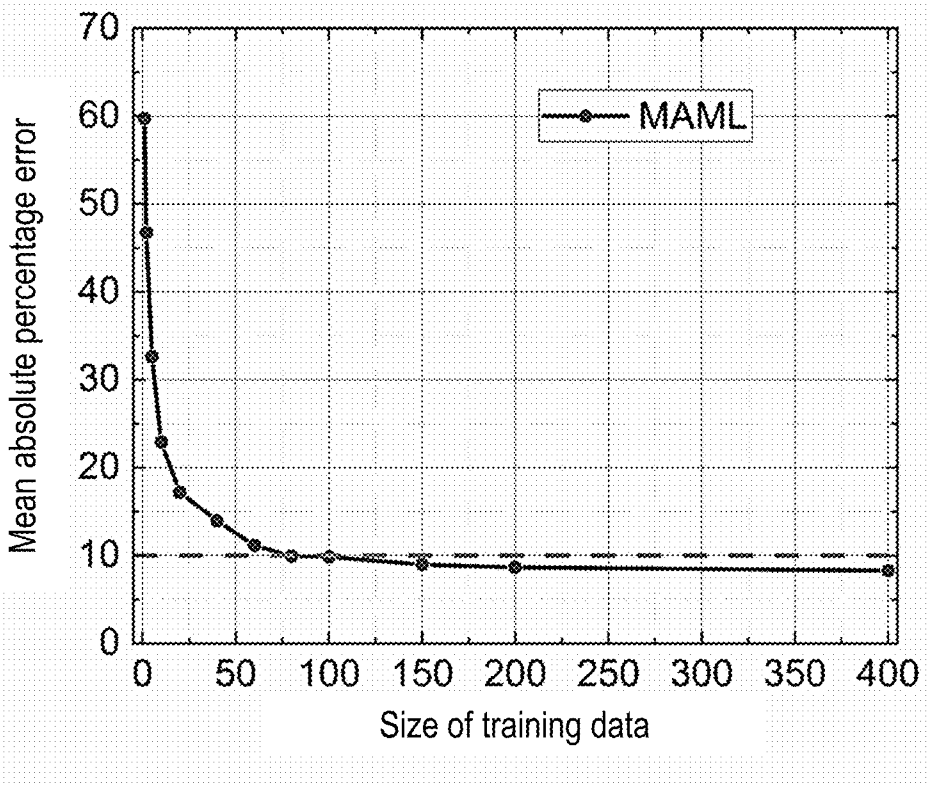
FIG. 7 is an example performance diagram of a quality of transmission estimator for a method for providing virtual network topology configuration services based on MAML and transfer learning according to an embodiment of the present invention.

As shown in FIG. 5 to FIG. 7, an embodiment of the present invention provides a method for providing virtual network topology configuration services based on MAML and transfer learning. In this embodiment, software-defined network structures were configured, in accordance with FIG. 3 and FIG. 4, on four node SDM testbeds shown in FIG. 5, and automatic VNT configuration experiments were performed. Each SXC node was realized by an optical switch cut from a large port-count matrix optical switch. The testbed included two 16.5-km seven-core fibers deployed in the field and two standard single-mode fibers. Optical connections to transponders operating at 16-32 gbaud were set, and the QPSK or 16QAM modulation format was used. An SDN control plane system was installed on an ONOS platform, and an orchestrator was deployed on a single machine. For the communications among the controller, SXCs, and the orchestrators, southbound and northbound interfaces were implemented via the NETCONF protocol and secure TCP connections, respectively.

First, a user initiated a 3-node VNT request shown in FIG. 5. The target baud rate, modulation format and QoT (BER) boundary were 32 gbaud, 16-QAM and 1.2e-3, respectively. Next, the orchestrator obtained a current SDM topology. Based on the current resource utilization and the requested QoT target, the orchestrator decided to map VNTs to SXC1, SXC3 and SXC4 and assigned SXC1-SXC2-SXC3 (core #2, core #4), SXC3-SXC4 and SXC4-SXC1 as virtual links. The orchestrator instructed the SDM controller to configure the SXCs according to the instructions of the VNT controller of a vendor. FIG. 6 illustrates the distribution of VNT configuration time in 90 independent experiments. The average VNT configuration time was 2.3 seconds and the upper limit was 2.8 seconds. After successfully configuring the VNTs, the orchestrator executed MAML and the transfer learning algorithm to provide a tenant with a QoT estimator, the estimator being capable of simulating the transport properties of a virtual machine. To collect data, this embodiment changes cores of the seven-core fiber and the format of modulation signals to collect data samples. The algorithm used a total of 2,322 samples, of which 1,611 samples formed a generic dataset and the remaining samples were collected specifically for the VNTs. Fifteen feasible neural network configurations were set, where the number of layers of the neural network ranged from 1 to 15. The algorithm chose the configuration 5 with the lowest mean absolute percentage error as the target configuration. FIG. 7 shows the performance of the provisioned QoT estimator in training datasets of different sizes. Eighty training samples were used, which may achieve prediction accuracy of >90% on a test set.

Embodiment 3

Figure 2:
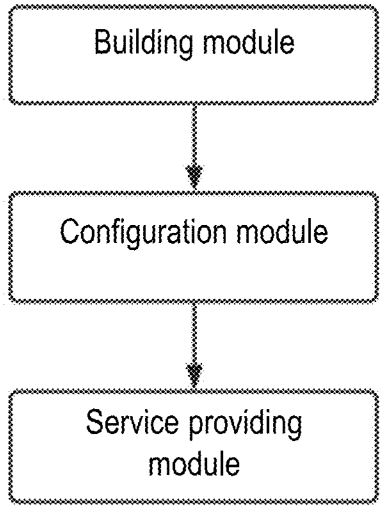
FIG. 2 is a block diagram of a system for providing virtual network topology configuration services based on MAML and transfer learning according to an embodiment of the present invention.

As shown in FIG. 2, a system for providing virtual network topology configuration services based on MAML and transfer learning according to an embodiment of the present invention includes:

- a building module configured to build a network architecture using a software-defined network;
- a configuration module configured to receive, by the network architecture, configuration information to configure a virtual network topology; and
- a service providing module configured to call, by the network architecture, an intelligent machine learning service providing module to execute an MAML algorithm and a transfer learning algorithm to provide a user with machine learning services, the machine learning services including quality of transmission estimation, fault management, and resource allocation.

In this embodiment, the network architecture and the multi-granularity node structure are built by using the software-defined network, the network architecture receives the configuration information to configure the virtual network topology, and finally the network architecture calls the intelligent machine learning service providing module to execute the MAML algorithm and the transfer learning algorithm to provide the user with the machine learning services, so that automatic and intelligent provision of the machine learning services is achieved, and the problems of poor quality of service and low efficiency caused by manual deployment of a machine model for a network to provide machine learning services are avoided. Therefore, the model deployment time is shortened, and the deployment efficiency and the quality of service are improved.

Embodiment 4

This embodiment further preferably provides a computer-readable storage medium, and a computer program of a method for providing virtual network topology configuration services based on MAML and transfer learning is stored on the computer-readable storage medium. The computer program of the method for providing virtual network topology configuration services based on MAML and transfer learning, when processed, implements the steps of the method for providing virtual network topology configuration services based on MAML and transfer learning.

In summary, the embodiments of the present invention provide the method and system for providing virtual network topology configuration services based on MAML and transfer learning, and the storage medium. The network architecture and the multi-granularity node structure are built by using the software-defined network, the network architecture receives the configuration information to configure the virtual network topology, and finally the network architecture calls the intelligent machine learning service providing module to execute the MAML algorithm and the transfer learning algorithm to provide the user with the machine learning services, so that automatic and intelligent provision of the machine learning services is achieved, and the problems of poor quality of service and low efficiency caused by manual deployment of a machine model for a network to provide machine learning services are avoided. Therefore, the model deployment time is shortened, and the deployment efficiency and the quality of service are improved.

The above are only preferred implementations of the present invention. It should be noted that those of ordinary skill in the art can also make several improvements and substitutions without departing from the technical principle of the present invention, and these improvements and substitutions shall also fall within the scope of the present invention.

What is claimed is:

1. A method for providing virtual network topology configuration services based on model-agnostic meta-learning (MAML) and transfer learning, executed by a processor, characterized by comprising:

step S1: building a network architecture using a software-defined network, wherein the network architecture comprises a network orchestrator, a virtual network topology and a physical base, the physical base comprises a space division multiplexing controller and a multi-granularity node structure, the multi-granularity node structure comprises a multi-core optical fiber, an optical switch and a wavelength selection switch, a fan-in and fan-out device of the multi-core optical fiber and the wavelength selection switch are connected to the optical switch to realize multi-granularity switching performed by space division multiplexing network nodes in core and spectrum dimensions, the network orchestrator is configured to receive configuration information comprising first information and second information sent by a user, the first information is a virtual network and machine learning services required by the user, and the second information is a quality of transmission requirement of the user under a specific baud rate and modulation format, the space division multiplexing controller is configured to receive a request sent by the network orchestrator to acquire current space division multiplexing network topology information, and send a space division multiplexing network topology to the network orchestrator;

step S2: configuring, by the network orchestrator, the virtual network topology based on the configuration information, to map the virtual network topology to a lightpath of the physical base; and step S3: calling, by the network architecture, an intelligent machine learning service providing module to execute an MAML algorithm and a transfer learning algorithm to provide the user with the machine learning services, the machine learning services comprising quality of transmission estimation, fault management, and resource allocation.

2. The method for providing virtual network topology configuration services based on MAML and transfer learning according to claim 1, wherein the space division multiplexing network nodes have an optical monitoring function.

3. The method for providing virtual network topology configuration services based on MAML and transfer learning according to claim 2, wherein the optical monitoring function comprises measurement of power and noise levels.

4. The method for providing virtual network topology configuration services based on MAML and transfer learning according to claim 1, wherein the step S2 comprises:

acquiring, by the network orchestrator, a sublevel space division multiplexing network topology, and calling a virtual network topology mapping algorithm according to the configuration information to calculate nodes, link mapping and space/spectrum channel allocation of a required space division multiplexing network; and sending, by the network orchestrator, third information to the space division multiplexing controller, mapping, by the space division multiplexing controller, corresponding node constraints to corresponding base nodes, mapping, by the space division multiplexing controller, virtual link resources to the lightpath of the physical base, and transmitting, by the network orchestrator, fourth information to a virtual network topology controller such that the virtual network topology controller updates the virtual network topology, so as to complete configuration of the virtual network topology, the third information being to isolate and allocate resources of the physical base, the fourth information being a new virtual network topology.

5. A non-transitory computer-readable storage medium having a computer program stored thereon, characterized in that the computer program, when executed by a processor, implements the method for providing virtual network topology configuration services based on MAML and transfer learning according to claim 1.

6. A non-transitory computer-readable storage medium having a computer program stored thereon, characterized in that the computer program, when executed by a processor, implements the method for providing virtual network topology configuration services based on MAML and transfer learning according to claim 2.

7. A non-transitory computer-readable storage medium having a computer program stored thereon, characterized in that the computer program, when executed by a processor, implements the method for providing virtual network topology configuration services based on MAML and transfer learning according to claim 3.

8. A non-transitory computer-readable storage medium having a computer program stored thereon, characterized in that the computer program, when executed by a processor, implements the method for providing virtual network topology configuration services based on MAML and transfer learning according to claim 4.

9. A system for providing virtual network topology configuration services based on model-agnostic meta-learning (MAML) and transfer learning, characterized by comprising:

a processor configured to build a network architecture using a software-defined network;

wherein the network architecture comprises a network orchestrator, a virtual network topology and a physical base, the physical base comprises a space division multiplexing controller and a multi-granularity node structure, the multi-granularity node structure comprises a multi-core optical fiber, an optical switch and a wavelength selection switch, a fan-in and fan-out device of the multi-core optical fiber and the wavelength selection switch are connected to the optical switch to realize multi-granularity switching performed by space division multiplexing network nodes in core and spectrum dimensions, the network orchestrator is configured to receive configuration information comprising first information and second information sent by a user, the first information is a virtual network and machine learning services required by the user, and the second information is a quality of transmission requirement of the user under a specific baud rate and modulation format, the space division multiplexing controller is configured to receive a request sent by the network orchestrator to acquire current space division multiplexing network topology information, and send a space division multiplexing network topology to the network orchestrator, the processor is configured to configure the virtual network topology based on the configuration information, to map the virtual network topology to a lightpath of the physical base;

the processor is configured to call, by the network architecture, an intelligent machine learning service providing module to execute an MAML algorithm and a transfer learning algorithm to provide the user with the machine learning services, the machine learning services comprises quality of transmission estimation, fault management, and resource allocation.

* * * * *